United States Patent
Kaplan et al.

(10) Patent No.: US 9,212,250 B2
(45) Date of Patent: Dec. 15, 2015

(54) METHOD OF IMPROVING MECHANICAL STRENGTH OF FLEXIBLE POLYURETHANE FOAMS MADE FROM BIO-BASED POLYOLS, THE POLYOL COMPOSITIONS UTILIZED THEREIN AND THE FOAMS PRODUCED THEREBY

(75) Inventors: Warren A. Kaplan, Libertyville, IL (US); Xiuguang A. Guo, Wilmette, IL (US); David J. Norberg, Grayslake, IL (US)

(73) Assignee: Stepan Company, Northfield, IL (US)

( * ) Notice: Subject to any disclaimer, the term of this patent is extended or adjusted under 35 U.S.C. 154(b) by 146 days.

(21) Appl. No.: 13/508,022

(22) PCT Filed: Nov. 4, 2010

(86) PCT No.: PCT/US2010/055514
§ 371 (c)(1),
(2), (4) Date: Jul. 12, 2012

(87) PCT Pub. No.: WO2011/057018
PCT Pub. Date: May 12, 2011

(65) Prior Publication Data
US 2012/0277338 A1    Nov. 1, 2012

Related U.S. Application Data

(60) Provisional application No. 61/280,442, filed on Nov. 4, 2009.

(51) Int. Cl.
*C08G 18/40* (2006.01)
*C08G 18/42* (2006.01)
*C08G 18/48* (2006.01)
*C08G 18/63* (2006.01)
*C08G 101/00* (2006.01)

(52) U.S. Cl.
CPC ........ *C08G 18/4018* (2013.01); *C08G 18/4072* (2013.01); *C08G 18/4211* (2013.01); *C08G 18/4261* (2013.01); *C08G 18/4288* (2013.01); *C08G 18/4854* (2013.01); *C08G 18/4887* (2013.01); *C08G 18/632* (2013.01); *C08G 2101/005* (2013.01); *C08G 2101/0008* (2013.01); *C08G 2101/0083* (2013.01); *C08G 2350/00* (2013.01)

(58) Field of Classification Search
CPC ................................... C08G 18/4018
USPC ....................................... 521/172
See application file for complete search history.

(56) References Cited

U.S. PATENT DOCUMENTS

| | | |
|---|---|---|
| 1,922,459 A | 8/1933 | Schmidt et al. |
| 4,048,104 A | 9/1977 | Carlstrom et al. |
| 4,346,229 A | 8/1982 | Derr et al. |
| 4,416,822 A | 11/1983 | Campbell |
| 4,439,549 A | 3/1984 | Brennan |
| 4,485,196 A | 11/1984 | Brennan et al. |
| 4,521,611 A | 6/1985 | Magnus et al. |
| 4,526,908 A | 7/1985 | Keyes et al. |
| 4,529,744 A | 7/1985 | Wood |
| 4,595,711 A | 6/1986 | Wood |
| 4,604,410 A | 8/1986 | Altenberg |
| 4,608,432 A | 8/1986 | Kelley et al. |
| 4,644,027 A | 2/1987 | Loeb et al. |
| 4,644,047 A | 2/1987 | Wood |
| 4,644,048 A | 2/1987 | Loeb et al. |
| 4,701,477 A | 10/1987 | Altenberg et al. |
| 4,722,803 A | 2/1988 | Kelley et al. |
| 4,753,967 A | 6/1988 | Londrigan |
| 4,758,602 A | 7/1988 | Trowell |
| 5,360,900 A | 11/1994 | DeLeon et al. |
| 5,877,227 A | 3/1999 | Murty |
| 5,922,779 A | 7/1999 | Hickey |
| 5,925,687 A * | 7/1999 | Guettes et al. ................ 521/137 |
| 6,093,777 A | 7/2000 | Boogh et al. |
| 6,107,433 A | 8/2000 | Guo et al. |
| 6,359,022 B1 | 3/2002 | Hickey et al. |
| 6,433,121 B1 | 8/2002 | Petrovic et al. |
| 6,569,352 B1 | 5/2003 | Hillshafer et al. |
| 6,573,354 B1 | 6/2003 | Petrovic et al. |
| 6,686,435 B1 | 2/2004 | Petrovic et al. |
| 6,855,844 B1 | 2/2005 | Geiger et al. |
| 7,786,239 B2 | 8/2010 | Petrovic et al. |
| 2006/0169948 A1* | 8/2006 | Neill et al. ................ 252/182.24 |

(Continued)

FOREIGN PATENT DOCUMENTS

| | | |
|---|---|---|
| WO | WO-9942508 | 8/1999 |
| WO | WO-0210247 | 2/2002 |
| WO | WO-2009045926 | 4/2009 |

*Primary Examiner* — Melissa Rioja
(74) *Attorney, Agent, or Firm* — Dilworth IP LLC

(57) ABSTRACT

A method of improving the mechanical strength of polyurethane foams made from bio-based polyols, the polyol-containing compositions utilized in the method of the invention, and the polyurethane foams produced by the method of the invention are provided. The method of the invention involves the incorporation of aromatic polyester polyol in the polyol-containing composition used to manufacture the foams. In one embodiment, the aromatic polyester polyol is utilized in a polyol-containing composition which is employed in the manufacture of flexible polyurethane foam. In another embodiment, the aromatic polyester polyol transesterified with a natural oil-containing composition to form a transesterification reaction product that is utilized in a polyol-containing composition which is employed in the manufacture of flexible polyurethane foam. Flexible polyurethane foams of the invention exhibit substantial improvements in mechanical strength properties, such as tear strength, tensile strength and elongation relative to foams made from bio-based polyols such as soybean oil-based polyols.

6 Claims, No Drawings

(56) References Cited

U.S. PATENT DOCUMENTS

| | | |
|---|---|---|
| 2007/0238798 A1 | 10/2007 | McDaniel et al. |
| 2007/0254973 A1* | 11/2007 | Emge et al. .................... 521/170 |
| 2010/0240785 A1* | 9/2010 | Hickey et al. .................. 521/157 |
| 2011/0275749 A1* | 11/2011 | Uyama et al. .................. 524/291 |

* cited by examiner

METHOD OF IMPROVING MECHANICAL STRENGTH OF FLEXIBLE POLYURETHANE FOAMS MADE FROM BIO-BASED POLYOLS, THE POLYOL COMPOSITIONS UTILIZED THEREIN AND THE FOAMS PRODUCED THEREBY

This application is a national stage entry under 35 U.S.C. §371(c) of PCT/US10/55514, filed Nov. 4, 2010, which claims the benefit of provisional U.S. Appl. Ser. No. 61/280,442, filed Nov. 4, 2009.

FIELD OF THE INVENTION

The present invention relates to a method of improving the mechanical strength of flexible polyurethane foams made from bio-based polyols, to the polyol compositions utilized in the method of the invention, and to flexible polyurethane foams produced by the method of the invention.

BACKGROUND OF THE INVENTION

Flexible polyurethane foam is used extensively in a variety of applications requiring the unique mechanical, sound absorbing, load-bearing and/or other properties this material provides. Flexible polyurethane foams are made by reaction of at least one polyisocyanate containing isocyanate (NCO) groups with at least one polyol containing hydroxyl (OH) groups in the presence of blowing agent, surfactant, catalyst and other optional additives. The blowing agent most commonly used is water, which reacts with polyisocyanate to form carbon dioxide and polyurea. The polyurea is present along with the polyurethane resulting from the polyisocyanate-polyol reaction.

Flexible polyurethane foams are typically produced using either a slabstock foam manufacturing process or a molded flexible foam manufacturing process. A slabstock flexible foam is typically produced in either a high pressure or low pressure machine having a continuous mixer. Such continuous mixing machines may generally produce 100 pounds or more per minute of slabstock foam. In general, the production of slabstock foam involves the metering of a polyol-containing composition and a polyisocyanate-containing composition from separate feed lines (i.e., streams) via a mixing head having a pin mixer or high shear mixer into a trough. The product begins to froth and rise out of the trough and overflows onto fall plates. On the fall plates, the product continues to rise and contacts a conveyor. The product cures as the conveyor carries it along a length forming the slabstock foam. The conveyors are typically lined with a paper or plastic liner to allow for easy removal of the slabstock foam. As the foam exits the machine, it is cut into large blocks.

In general, a molded flexible foam is typically produced by mixing a polyol-containing composition and a polyisocyanate-containing composition in a metered foam mixing and dispensing unit to form a foam intermediate composition and dispensing the foam intermediate composition into a sufficiently heated mold of desired design. The mold is typically vented to allow for the build up and subsequent release of internal pressure, has two or more sections with provisions for automatic opening and closing, and may be formed from cast, aluminum or any other suitable material. Following the mixing and dispensing steps, the lid of the mold is closed and locked, and the foam intermediate composition is allowed to cure at a sufficient temperature, for a sufficient period of time. A sufficiently heated oven capable of receiving the mold may also be employed during the curing step. Once the curing step has completed, the lid of the mold is opened and the resultant foam product is removed and then transferred to a foam cell-crushing device which is used to apply pressure to the foam product in order to open the cells prior to being processed via other related finished-foam handling systems such as trimming and fabrication. During trimming and fabrication, the foam is converted into a finished product such as an automobile seating cushion.

Typically, slabstock and molded flexible foams are made from a polyether polyol, a polyisocyanate such as toluene diisocyanate, an amine catalyst and a tin catalyst. Polyether polyols traditionally used to make polyurethane foam are generally derived from petroleum-based raw materials. A standard polyether polyol used in the flexible slabstock foam industry is produced by reaction of propylene oxide with glycerin in the presence of alkoxylation catalyst. Functionality, molecular weight and the alkoxide composition of the polyol (or polyol blend) can be adjusted to affect physical and/or processing properties of the foam produced.

The flexible foam industry has witnessed a significant increase in the use of bio-based polyols, which are incorporated into a formulation at the expense of petroleum-based polyether polyol. The ability to claim a level of bio-renewable content within the foam provides a competitive marketing advantage relative to those not incorporating this type of polyol. Additionally, flexible foam manufacturers have the added potential to realize cost savings through extensive use of these polyols since they generally possess a lower raw material cost than standard petroleum-based polyether polyol.

Bio-based polyols are typically natural oil based. The natural oils, with the exception of those oils having hydroxyl functionality (e.g. castor oil, or lesquerella oil), typically lack isocyanate reactive functionality, and must undergo chemical transformation, such as, for example, transesterification with functionalized materials, epoxidation and ring opening, oxidation, ozonolysis, or hydroformylation to add reactive functionality. The added reactive functionality could be any active hydrogen moiety, and is typically hydroxyl groups or amines. There are challenges to the use of natural oils as raw materials for polyols to be used in polyurethane foam products. The mechanical strength properties such as tear strength, tensile strength and elongation ("TTE") of foams formed from the reaction of functionalized natural oils with isocyanate are typically deteriorated relative to foams made solely from petrochemical polyols. This deterioration of foam properties can be due, at least in part, to the plasticization of the foam by the relatively high aliphatic concentration of the natural oils. The deterioration of foam properties can also be due, at least in part, to the poor reactivity of the functional group due to steric hindrance by the aliphatic chains of the oil, and the incompatibility of the natural oil polyol with the isocyanate. The loss of these physical properties effectively limits the amount of bio-based polyol that can be incorporated into a flexible foam or formulation.

In view of the foregoing, a method that enables the improvement of the mechanical strength properties of flexible foams made from bio-based polyol and the use of higher concentrations of bio-based polyols without resulting in a loss of mechanical strength properties would represent a significant advancement in the art.

SUMMARY OF THE INVENTION

While aromatic polyester polyols have been widely used in the manufacture of rigid polyurethane foams, they have not been extensively employed in the manufacture of flexible foams due to their propensity to increase rigidity and reduce the resiliency characteristics of flexible foams. It has now surprisingly been found that incorporation of aromatic polyester polyol into a polyol-containing composition containing bio-based polyol and petroleum-based polyether polyol significantly improves at least one mechanical strength property selected from the group consisting of tear strength, tensile strength and elongation (TTE) properties of flexible foams made from the polyol-containing composition relative to the mechanical strength properties of flexible foams made from polyol-containing compositions that do not contain the aromatic polyester polyol.

As utilized herein, "mechanical strength properties" are measured by ASTM D3574-08. The polyol-containing composition herein comprises an aromatic ester content derived from the aromatic polyester polyol of at least about 2 weight percent, based on the total weight of the polyol-containing composition. The incorporation of aromatic polyester polyol, a material heretofore not employed in significant amounts in the production of flexible foams, into the polyol-containing composition surprisingly yields a significant increase in at least one mechanical strength property of the resultant foams. In certain embodiments, improvements of at least about 10% of at least one mechanical strength property (as measured by ASTM D3574-08) have been obtained through the practice of the present invention.

In accordance with one embodiment of the invention, the aromatic polyester polyol and the bio-based polyol are utilized as co-components of a polyol-containing composition that further comprises petroleum-based polyether polyol, wherein the polyol-containing composition comprises an aromatic ester content derived from the aromatic polyester polyol of at least about 2 weight percent, based on the total weight of the polyol-containing composition. Such polyol-containing composition may be advantageously utilized to manufacture a polyurethane foam exhibiting at least one improved mechanical strength property (as measured by ASTM D3574:08).

In accordance with another embodiment of the invention, aromatic polyester polyol is reacted with a natural oil-based composition comprising at least one natural oil or at least one functionalized natural oil, or a combination of at least one natural oil and at least one functionalized natural oil, under transesterification reaction conditions sufficient to provide a transesterification reaction product of the aromatic polyester polyol and the natural oil-based composition. Substantial improvements in at least one mechanical strength property in polyurethane foams made from polyol-containing compositions comprising petroleum-based polyether polyol and the transesterification reaction product have been observed relative to mechanical strength properties of foams made from polyol-containing compositions that contain petroleum-based polyether polyol and bio-based polyol, but do not contain any amount of aromatic polyester polyol.

Thus, in accordance with one embodiment of the present invention, a method of improving at least one mechanical strength property (as measured by ASTM D3574-08) of a polyurethane foam is provided which comprises reacting a polyol-containing composition and a polyisocyanate-containing composition under flexible polyurethane foam forming conditions to provide a flexible polyurethane foam, wherein the polyol-containing composition comprises bio-based polyol, aromatic polyester polyol and petroleum-based polyether polyol and further wherein the polyol-containing composition comprises an aromatic ester content derived from the aromatic polyester polyol of at least about 2 weight percent, based on the total weight of the polyol-containing composition, said flexible polyurethane foam exhibiting at least about a 10 percent increase in at least one mechanical strength property (as measured by ASTM D3574-08) as compared to the mechanical strength properties (as measured by ASTM D3574-08) of a flexible polyurethane foam made under substantially identical conditions except for the exclusion of the aromatic polyester polyol component. The phrase "substantially identical conditions" utilized throughout this disclosure shall be understood to allow for only minor and incidental differences between reaction conditions or components (except of course for the use of aromatic polyester polyol and/or transesterification reaction product disclosed herein). By way of illustration, where such differences between reaction conditions may be quantified (as, for example, in calculating the amounts used for various components), such differences would be of such a magnitude as to not exceed about 1%.

Further in accordance with the practice of the present invention, a method of improving at least one mechanical strength property (as measured by ASTM D3574-08) of a polyurethane foam is provided which comprises reacting a polyol-containing composition and a polyisocyanate-containing composition under flexible polyurethane foam forming conditions to provide a flexible polyurethane foam, wherein the polyol-containing composition comprises petroleum-based polyether polyol and a transesterification reaction product obtained by reacting, under transesterification reaction conditions, a natural oil-containing composition comprising at least one natural oil or functionalized natural oil, or a combination of at least one natural oil and at least one functionalized natural oil, and aromatic polyester polyol, and further wherein the polyol-containing composition comprises an aromatic ester content of at least about 2 weight percent derived from the aromatic polyester polyol, based on the total weight of the polyol-containing composition, said flexible polyurethane foam exhibiting at least about a 10 percent increase in at least one mechanical strength property (as measured by ASTM D3574-08) as compared to the mechanical strength properties (as measured by ASTM D3574-08) of a flexible polyurethane foam made under substantially identical conditions except for the exclusion of the transesterification reaction product from the polyol-containing composition and the use of petroleum-based polyether polyol and bio-based polyol as co-components in the polyol-containing composition.

Further in accordance with the practice of the present invention, a polyol-containing composition useful for the production of a flexible polyurethane foam is provided, the polyol-containing composition comprising bio-based polyol, aromatic polyester polyol and petroleum-based polyether polyol, the polyol-containing composition comprising an aromatic ester content of at least about 2 weight percent derived from the aromatic polyester polyol, based on the total weight of the polyol-containing composition.

Further in accordance with the practice of the present invention, a polyol-containing composition useful for the production of a flexible polyurethane foam is provided, the polyol-containing composition comprising petroleum-based polyether polyol and a transesterification reaction product obtained by reacting, under transesterification reaction conditions, a natural oil-containing composition comprising at least one natural oil or functionalized natural oil, or a combination of at least one natural oil and at least one functionalized natural oil, and aromatic polyester polyol, the polyol-containing composition comprising an aromatic ester content of at least about 2 weight percent derived from the aromatic polyester polyol, based on the total weight of the polyol-containing composition.

Further in accordance with the practice of the present invention, a polyurethane foam made from bio-based polyol is provided which is produced by the method of the present invention, namely, by reacting a polyol-containing composition and a polyisocyanate-containing composition under flexible polyurethane foam forming conditions to provide a flexible polyurethane foam, wherein the polyol-containing composition comprises bio-based polyol, aromatic polyester polyol and petroleum-based polyether polyol, and further wherein the polyol-containing composition comprises an aromatic ester content derived from the aromatic polyester polyol of at least about 2 weight percent, based on the total weight of the polyol-containing composition, the flexible polyurethane foam exhibiting at least about a 10 percent increase in at least one mechanical strength property (as measured by ASTM D3574-08) as compared to the mechanical strength properties (as measured by ASTM D3574-08) of a flexible polyurethane foam made under substantially identical conditions except for the exclusion of the aromatic polyester polyol component.

Further in accordance with the practice of the present invention, a polyurethane foam is provided which is produced by reacting a polyol-containing composition and a polyisocyanate-containing composition under flexible polyurethane foam forming conditions to provide a flexible polyurethane foam, wherein the polyol-containing composition comprises petroleum-based polyether polyol and the transesterification reaction product obtained by reacting, under transesterification reaction conditions, a natural oil-containing composition comprising at least one natural oil or functionalized natural oil, or a combination of at least one natural oil and at least one functionalized natural oil, and aromatic polyester polyol, and further wherein the polyol-containing composition comprises an aromatic ester content derived from the aromatic polyester polyol of at least about 2 weight percent, based on the total weight of the polyol-containing composition, the flexible polyurethane foam exhibiting at least about a 10 percent increase in at least one mechanical strength property (as measured by ASTM D3574-08) as compared to the mechanical strength properties (as measured by ASTM D3574-08) of a flexible polyurethane foam made under substantially identical conditions except for the exclusion of the transesterification reaction product and the use of petroleum-based polyether polyol and bio-based polyol as co-components in the polyol-containing composition.

DETAILED DESCRIPTION OF THE INVENTION

In the instant invention, by OH value (OHv) is meant hydroxyl value, a quantitative measure of the concentration of hydroxyl groups, usually stated as mg KOH/g, i.e., the number of milligrams of potassium hydroxide equivalent to the hydroxyl groups in 1 g of substance. By functionality is meant the number of reactive groups, e.g., hydroxyl groups, in a chemical molecule. Primary, secondary and tertiary aliphatic hydroxyl functionalities are all suitable for the formation of the polyol-containing composition. However, for molded flexible foams, polyol-containing compositions which contain either substantially primary hydroxyls or which contain mixtures of hydroxyls containing greater than about 35% by equivalent secondary hydroxyls with primary hydroxyls are generally preferred, and for slabstock foams, mixtures of greater than about 50% by equivalent secondary hydroxyls with primary hydroxyls are generally preferred and mixtures of greater than about 65% secondary hydroxyls are more preferred.

Bio-Based Polyol

The bio-based polyol comprises at least one functionalized natural oil or functionalized natural oil-derived fatty acid and/or fatty acid ester containing isocyanate-reactive primary or secondary hydroxyl groups and a functionality of at least about 1.5, preferably at least about 2.0. The term "bio-based" utilized herein shall be understood as referring to polyols at least about 80% by weight or more of the contents of which are directly or indirectly obtained from a natural oil. The term "natural oil" includes, but is not limited to, vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, carnellina oil, and castor oil. Representative non-limiting examples of animal fats include lard, tallow, poultry fat, yellow grease, and fish oil. Tall oils are by-products of wood pulp manufacture. In certain embodiments, the natural oil may be partially to fully hydrogenated. In other embodiments, the natural oil may be refined, bleached, and/or deodorized. The term "functionalized" is utilized in its broadest sense and is intended to cover natural oils as well as the fatty acids and/or fatty acid esters derived from those natural oils that contain connate hydroxyl groups, e.g., castor oil and/or the fatty acid of castor oil, i.e., ricinoleic acid, and esters of ricinoleic acid, as well as natural oils and the fatty acids and/or fatty acid esters derived from those natural oils which have been chemically modified to impart hydroxyl functionality thereto. In addition to functionalized natural oil, the bio-based polyol may optionally include natural oils or the fatty acids and/or fatty acid esters derived from those natural oils that are not functionalized with hydroxyl functionality, e.g., natural oils and the fatty acids or fatty acid esters derived from the natural oils that either do not contain connate hydroxyl groups or have not been chemically modified to impart hydroxyl functionality thereto. In certain embodiments, the bio-based polyol possesses a hydroxyl value (OHv) ranging from about 25 to about 230, particularly from about 40 to about 130, more particularly from about 50 to about 60, mg KOH/g. In certain embodiments, the bio-based polyol possesses a viscosity ranging from about 2000 to about 6000 centipoise at 25° C. The bio-based polyol will typically represent at least about 5 to about 40 weight percent of the polyol components present in the polyol-containing composition. For example, the bio-based polyol may represent about 5, about 10, about 15, about 20, about 25, about 30, about 35, or about 40, weight percent of the polyol components present in the polyol-containing composition.

Functionalized natural oils are available commercially. They may comprise one or more natural oils or the fatty acids and/or fatty acids derived from the natural oils that have been epoxidized and then reacted with one or more mono-ols and/or or diols to form a bio-based polyol having primary or secondary hydroxyl groups. In some embodiments, the functionalized natural oils can be, for example, castor oil, functionalized castor oil, functionalized coconut oil, functionalized cochin oil, functionalized corn oil, functionalized cottonseed oil, functionalized linseed oil, functionalized olive oil, functionalized palm oil, functionalized palm kernel oil, functionalized peanut oil, functionalized soybean oil, functionalized sunflower oil, functionalized tall oils, functionalized tallow, functionalized lesquerella oil, functionalized tung oil, functionalized whale oil, functionalized tea seed oil, functionalized sesame seed oil, functionalized safflower oil, functionalized rapeseed oil, functionalized fish oils, derivatives thereof, and combinations thereof.

In some embodiments, the bio-based polyol can be prepared by epoxidizing a natural oil and subsequently reacting the epoxidized natural oil with water and/or a hydroxylated material to convert the epoxy groups to OH groups. Bio-based polyols based on epoxidized natural oils are commercially available, or alternatively can be prepared by reacting unsaturated natural oils with a peroxyacid to form the epoxidized oil. Various methods are described in the art for preparing these epoxidized oils, including for example the methods described in U.S. Pat. Nos. 6,107,433; 6,433,121; 6,573,354; and 6,686,435, the contents of which are incorporated herein for their teachings of bio-based polyols and their manufacture. Suitable materials for use in converting the epoxy groups to OH groups include any reactive hydrogen compounds such as hydrogen, water, lithium aluminum hydride, sodium borohydride, ammonia, or aliphatic or aromatic amines; aliphatic or aromatic alcohols and their alkoxides (mono functional), glycols, triols, tetraols, sugars etc.; carboxylic acids; mineral acids, including, for example, hydrochloric, sulfuric, and phosphoric acids. An amount of hydroxylated material is reacted with the epoxidized triglyceride oil sufficient to convert from about 10% to about 100% of the epoxy groups to hydroxy groups. The hydroxylation of the epoxidized natural oil can take place at temperatures ranging from about 50° C. to about 250° C. and at pressures ranging from 0 to about 4000 psi. The resulting bio-based polyol may have an OH value ranging from about 25 to about 500 mg KOH/g and an acid value of from 0 to about 10 mg KOH/g. Commercially available bio-based polyols that may be employed within the practice of the present invention are the bio-based polyols sold by Cargill under the tradename BiOH® and by Urethane Soy Systems under the trade name of SOYOL®.

In an alternative embodiment, the natural oil can be transamidated with an amine such as, for example, aliphatic or aromatic amines, alkanolamines, and ammonia. Suitable amines for use herein include ammonia, aniline, methyl amine, ethylamine, diethylamine, methyl ethanolamine, tallowamine, ethanolamine, diethanol amine, ethylene diamine, diethylene triamine, and mixtures thereof. One or more amines are reacted with the natural oil in an amount of about 10 to about 100 equivalent % based on the number of acyl groups present in the natural oil. These amine functionalized derivatives of natural oils may be utilized in combination with the hydroxyl functionalized derivatives of natural oils in the manufacture of flexible polyurethane foams within the scope of the present invention.

Petroleum-Based Polyether Polyol

Petroleum-based polyether polyols which can be utilized in the practice of the present invention are well known and are widely sold commercially. They are not particularly limited insofar as their selection and use are concerned. They may be used singly or as combinations of two or more polyether polyols. The term "petroleum-based" utilized herein with respect to polyether polyols shall be understood as referring to polyether polyols at least about 80% by weight or more of the contents of which are directly or indirectly obtained from a non-renewable resource such as crude oil. In some embodiments, at least about 90%, i.e., at least about 95%, by weight of the contents of petroleum-based polyether polyol are directly or indirectly obtained from a non-renewable resource such as crude oil. In certain embodiments, the petroleum-based polyether polyol possesses a hydroxyl value (OHv) ranging from about 20 to about 90, particularly from about 50 to about 60, mg KOH/g. The polyether polyol will typically represent at least about 40 to about 95 weight percent of the polyol components present in the polyol-containing composition. For example, the polyether polyol may represent about 40, about 45, about 50, about 55, about 60, about 65, about 70, about 75, about 80, about 85, about 90, or about 95, weight percent of the polyol components present in the polyol-containing composition.

These polyether polyols are typically produced by anionic polymerization of one or more alkylene oxides having preferably 2 to 4 carbons in the alkylene radical with alkali hydroxides such as sodium hydroxide or potassium hydroxide or alkali alcoholates, such as sodium methylate, sodium ethylate, or potassium ethylate or potassium isopropylate as catalysts in the presence of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts. Any suitable alkylene oxide may be employed such as ethylene oxide, 1,2-propylene oxide 1,3-propylene oxide, 1,2 butylene oxide, 2,3-butylene oxide, amylene oxides, styrene oxide, and mixtures of these oxides. The polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and random and block copolymer glycols prepared from blends or sequential addition of two or more alkylene oxides. The polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459.

Preferred petroleum-based polyether polyols include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylolpropane, 1,1,1-trimethylolethane, pentaerythritol, 1,2,6-hexanetriol, alpha-methyl glucoside, sucrose, and sorbitol. Examples of suitable petroleum-based polyether polyols that may be employed in the practice of the invention are ARCOL F-3022 available from Bayer Material Science, and CARPOL GP-3000 available from Carpenter Company. Useful polyether polyols also include the alkylene oxide addition products of polyhydric alcohol compounds derived from phenol, such as 2,2-bis(4-hydroxyphenyl)-propane, commonly known as Bisphenol A.

Aromatic Polyester Polyol

Aromatic polyester polyols are the product of esterification of a polyhydric alcohol and a polybasic acid, ester or anhydride or a polybasic acid, ester or anhydride mixture, wherein at least one of the two reactants contains an aromatic ring. The aromatic polyester polyol will typically represent at least about 5 to about 40 weight percent of the polyol components present in the polyol-containing composition. For example, the aromatic polyester polyol may represent about 5, about 10, about 15, about 20, about 25, about 30, about 35, or about 40, weight percent of the polyol components present in the polyol-containing composition. The aromatic polyester polyol will typically possess a viscosity of less than about 50,000, particularly less than about 20,000, more particularly less than about 5,000, centipoise at 25° C., a hydroxyl functionality of at least about 2, and an OHv of at least about 40, particularly at least about 50, more particularly at least about 60, mg KOH/g.

The aromatic polyester polyol is employed in amounts sufficient to impart an aromatic ester content to the polyol-containing composition of at least about 2 weight percent, based on the weight of the polyol-containing composition.

It has unexpectedly been found that polyol-containing compositions comprising aromatic ester contents of at least about 2 weight percent confer substantial improvements in at least one mechanical strength property (as measured by ASTM D3574-08) of polyurethane foams made therefrom as compared to the mechanical strength properties (as measured by ASTM D3574-08) of polyurethane foams that are made under substantially identical conditions except for the inclusion of aromatic polyester polyol. The improvement in at least one mechanical strength property is directly attributable to the use of aromatic polyester polyol, a material that has not been traditionally employed in significant amounts in the manufacture of flexible foams. In some embodiments, improvements in TTE of on the order of about 10 percent or more have been observed. In terms of magnitude, such results are both substantial and unexpected, and therefore represent a significant advance in the flexible polyurethane foam art.

Aromatic polyester polyols are well known in the art (see for example, U.S. Pat. Nos. 4,608,432; 4,526,908; 4,529,744; 4,595,711; 4,521,611; 4,722,803; 4,644,027; 4,644,047; 4,644,048; 6,359,022; 5,922,779; 4,758,602; 4,701,477; 4,346,229; 4,604,410; 5360,900; 4,048,104; 4,485,196; 4,439,549; 4,615,822; 4,753,967 and WO 99/425,508. Each of these patent documents is incorporated by reference herein in its entirety for its teachings with respect to the manufacture and use of aromatic polyester polyols). These aromatic polyester polyols are prepared by forming esters between aromatic di- or poly-basic acids, esters or anhydrides and polyhydric alcohols.

Examples of aromatic di- and poly-basic acids, esters or anhydrides suitable for use in preparing aromatic polyester polyols include, but are not limited to: phthalic anhydride; dimethyl terephthalate; terephthalic acid; isophthalic acid; 1,8-naphthalic anhydride; 1,8-naphthalic dicarboxylic acid; 1,8-dimethyl naphthalate; dimethyl isophthalate; phthalic acid; dimethyl terephthalate bottoms; phthalic anhydride bottoms; pyromellitic anhydride; mellitic anhydride; mellitic acid; trimellitic anhydride; 3,3'4,4'-benzophenone tetracarboxylic anhydride; 3,3'4,4'-benzophenone tetracarboxylic acid; trimellitic acid; polyethylene terephthalate recycled polymer; polybutylene terephthalate recycled polymer; polyethylene terephthalate virgin polymer; polybutylene terephthalate virgin polymer; mixtures thereof; and the like.

Preferred examples of polyhydric alcohols suitable for use in preparing aromatic polyester polyols include: glycerine; ethylene glycol; diethylene glycol; triethylene glycol; tetraethylene glycol; propylene glycol; dipropylene glycol; tripropylene glycol; tetrapropylene glycol; trimethylene glycol; 1,1,1-trimethylol ethane; 1,2,3-trimethylolpropane; pentaerythritol; and poly(oxyalkylene)polyols in which each repeating unit contains two to four carbon atoms derived from the polyaddition of ethylene oxide, propylene oxide, or butylene oxide and mixtures thereof; 2-methyl-1,3-dihydroxy propane; and mixtures thereof to form equivalent weights from about 116 to about 2000 g/equivalent. Optionally, aromatic polybasic acids, esters or anhydrides may be directly alkoxylated with ethylene oxide, propylene oxide, butylene oxide or mixtures thereof to provide suitable aromatic polyester polyols.

Aromatic polyester polyols may be prepared from acyclic aliphatic di- or poly-basic acids or blends thereof and aromatic ring-containing polyhydric alcohols. In this case, it is preferred to use aliphatic dicarboxylic acids (or their alkyl esters) having 2 to 12 carbons, more preferably 4 to 8 carbon atoms in the alkylene radical. Examples of these dicarboxylic acids (or their alkyl esters) include but should not be limited to: succinic; glutaric; pimelic; undecanoic; dodecanoic; dodecanedioic; subaric; azelaic; sebacic; and most preferably adipic and mixtures thereof. In this case, examples of aromatic ring-containing polyhydric alcohols include but should not be limited to: aromatic heterocycle-containing diols; Spiro aromatic ring-containing diols; fused aromatic ring-containing diols; alkoxylated phenolformaldehyde resins; alkoxylated bis- or poly-phenols; alkoxylated dihydroxy benzenes and derivatives thereof; Mannich-type polyols; dimethylol cyclopentadiene; alkoxylated piperazine; alkoxylated di- or poly-hydroxy naphthalenes; halogenated aromatic ring-containing component polyols; combinations thereof and derivatives thereof.

Specific aromatic polyester polyols suitable for use in the practice of the invention include, for example, phthalic acid diethylene glycol polyester polyols. Such aromatic polyester polyols may optionally be alkoxylated (e.g., ethoxylated, propoxylated, or both) to form aromatic polyester-ether polyols. Suitable phthalic acid diethylene glycol polyester polyols are commercially available from Stepan Company, Northfield, Ill. Representative of such aromatic polyester polyols are Stepanpol® PS-70L (an alkoxylated diethylene glycol-phthalic anhydride-based polyester-ether polyol with a nominal OH value of 70 mg KOH/g and a functionality of 2) and Stepanpol® PS-2002 (a phthalic anhydride diethylene glycol polyester polyol having an OHv of 195 mg KOH/g and a functionality of 2), and mixtures thereof. Aromatic polyester-ether polyols that may be employed in the practice of the present invention are disclosed in commonly assigned U.S. Pat. Nos. 6,569,352 and 6,855,844, which are incorporated by reference herein for their teachings of aromatic polyester-ether polyols and their manufacture, as well for their teachings more generally of aromatic polyester polyols, aliphatic polyester polyols, and other optional polyols, as well as methods that may be used to make polyurethane foams that may be utilized in the practice of the present invention.

Transesterification

In one embodiment of the present invention, an aromatic polyester polyol is transesterified with a natural oil-containing composition comprising at least one natural oil or functionalized natural oil, or a combination of at least one natural oil and at least one functionalized natural oil, to form a transesterification reaction product having isocyanate-reactive functionality. During transesterification, at least a portion of the ester groups that are present in either or both of the aromatic polyester polyol and/or natural oil-containing composition (e.g., glycerol fatty acid ester bonds present in the natural oil or functionalized natural oil) react with at least a portion of the hydroxyl groups that are present in the aromatic polyester polyol and/or natural oil-containing composition causing the ester groups to rearrange resulting in the formation of polyols that differ from the starting polyol reactants. The reaction between the aromatic polyester polyol and natural oil-containing composition may also involve interesterification reactions wherein at least a portion of the ester groups that are present in either or both of the aromatic polyester polyol and/or natural oil-containing composition react with at least a portion of the ester groups that are present in either or both of the aromatic polyester polyol compound and/or natural oil-containing composition causing the ester groups to rearrange resulting in the formation of polyols that differ from the starting polyol reactants. In this fashion, the alcohol portions of the ester groups are more evenly distributed among the polyols present within the transesterification reaction product.

In the transesterification reaction, the aromatic polyester polyol and natural oil-containing composition are reacted at a temperature of from about 50 to about 250° C., particularly from about 100 to about 200° C., for a time period ranging from about 1 to about 24 hours, particularly from about 3 to about 10, hours. In one embodiment, the aromatic polyester polyol is formed in situ in the reaction vessel during the transesterification reaction. In accordance with this embodiment, the monomers used to form the aromatic polyester polyol, i.e., polybasic acid, ester or anhydride or mixture thereof, such as phthalic anhydride, and a polyhydric alcohol, such as ethylene glycol or diethylene glycol, are placed in the same reaction vessel with the natural oil-containing composition and subjected to transesterification reaction conditions. In another embodiment, a preformed aromatic polyester polyol is placed in the same reaction vessel with the natural oil-containing composition and subjected to transesterification reaction conditions. A catalyst may be employed to increase the rate of reaction. Examples of catalysts that may be employed include, but are not limited to, tin catalysts, titanium catalysts, alkali catalysts, acid catalysts, or enzymes. Representative tin catalysts include Fastcat® (tin oxide-based) catalysts available from Arkema, Inc., titanium catalysts include Tyzor® (titanium tetra-n-butoxide) catalysts available from DuPont, alkali catalysts include NaOH, KOH, sodium and potassium alkoxides, and acid catalysts include sulfuric acid, phosphoric acid, hydrochloric acid, and sulfonic acid.

As one skilled in the art will appreciate, the transesterification reaction produces a transesterification reaction product containing a complex mixture of different polyol species. The transesterification reaction product provides an aromatic ester content derived from the aromatic polyester polyol of at least about 2 weight percent, based on the total weight of the polyol-containing composition, and will typically possess a viscosity of less than about 50,000, particularly less than about 20,000, more particularly less than about 5,000, centipoise at 25° C., a hydroxyl functionality of at least about 2, and an OHv of at least about 40, particularly at least about 50, more particularly at least about 60, mg KOH/g. The transesterification reaction product will typically represent at least about 5 to about 40 weight percent of the polyol components present in the polyol-containing composition. For example, the transesterification reaction product may represent about 5, about 10, about 15, about 20, about 25, about 30, about 35, or about 40, weight percent of the polyol components present in the polyol-containing composition.

It has been found that flexible polyurethane foam made from a polyol-containing composition comprising the above described transesterification reaction product and petroleum-based polyether polyol exhibit at least about a 10 percent increase in at least one mechanical strength property (as measured by ASTM D3574-08) as compared to the mechanical strength properties (as measured by ASTM D3574-08) of a flexible polyurethane foam made under substantially identical conditions except for the exclusion of the aromatic polyester polyol component and the use of petroleum-based polyether polyol and bio-based polyol as co-components in the polyol-containing composition.

In another embodiment, the polyol-containing compositions disclosed herein may contain both aromatic polyester polyol and transesterified reaction product, either in combination with petroleum-based polyether polyols alone or in combination with petroleum-based polyether polyols and bio-based polyols.

Optional Polyols

Optional polyols which may be utilized in accordance with the practice of the present invention may include aliphatic polyester polyols. Aliphatic polyester polyols include, but are not limited to, materials based on caprolactone or adipic acid backbones. Aliphatic polyester polyols based on caprolactone include the homopolymerization products of caprolactone with a hydroxyl containing initiator, such as a diol, to form polycaprolactone polyols. Aliphatic polyester polyols based on adipic acid are prepared by the condensation of adipic acid and a diol, such as 1,6-hexanediol. Such materials are well known and are available commercially, including Stepanpol® AA-60, AA-61, AA-52, AA-53 polyols from Stepan Company.

Further examples of optional polyols are graft dispersion polyols, copolymer polyols, thioether polyols, polyester amides and polyacetals containing hydroxyl groups, aliphatic polycarbonates containing hydroxyl groups, and amine terminated polyoxyalkylene polyethers. Mixtures of at least two of the aforesaid polyols can be used as long as the combination has an average hydroxyl number in the aforesaid range. An example of a copolymer polyol component suitable for use as an optional polyol is ARCOL® HS-100, commercially available from Bayer Material Science. This particular copolymer polyol is a nominal 43 weight styrene/acrylonitrile solids containing 28 OH number polyol that is designed for use as a hardness adjusting agent in making molded polyurethane foams.

Blowing Agents

To prepare foam, water is most preferred for use as the blowing agent. However, any other way known to prepare polyisocyanate-based foams may be employed in addition to or instead of water. For example, the foam can be blown by using reduced or variable pressure, an inert gas such as nitrogen, air, carbon dioxide, argon, or other conventional blowing agents. Some examples of other conventional blowing agents are chorofluorocarboris, hydrofluorocarbons, hydrocarbons, hydrochlorocarbons, fluorocarbons, other classes of compounds having boiling points between about −20 and 100° C., and reactive blowing agents, i.e. agents which react with any of the ingredients, or decompose with heat in the reacting mixture, to liberate a gas which causes the mixture to foam.

Catalysts

The catalysts normally used to manufacture flexible foams are suitable for preparing the contemplated flexible foams. Included are organometallic compounds such as tin (II) salts of organic carboxylic acids and the dialkyl tin (IV) salts of organic carboxylic acids. These compounds may be used alone or preferably in combination with strongly basic amine compounds. The preferred amine catalysts are tertiary amine compounds, while the preferred organometallic catalysts are based on tin. More preferred catalysts include, but are not limited to, 33 weight % solution of triethylene diamine in dipropylene glycol, available under the trademark DABCO 33-LV from Air Products and Chemicals, Incorporated, a 70 weight % solution of bis(dimethylaminoethyl) ether in dipropylene glycol, available under the trademark NIAX A-1 from Momentive Performance Materials, and an octoate salt such as stannous octoate, available under the trademark TCAT 110 from Gulbrandsen Chemicals.

Buffers

Another contemplated foam formulation ingredient is a buffer. Exemplary buffers contemplated herein include alkali carbonate salts, alkali bicarbonate salts, and mixtures thereof. Some specific buffers contemplated here include sodium carbonate, sodium bicarbonate, potassium carbonate, potassium bicarbonate, and mixtures thereof, either added as separate ingredients or formed in situ.

Surfactants

Typical surfactants which may be used include, but are not limited to, nonionic surfactants such as MAKON® surfactants sold by Stepan Company; silicone-based surfactants such as NIAX® L-650 and NIAX® L-670 surfactant available from Momentive Performance Materials; DABCO® DC-5950 and DABCO® DC-5986 surfactants available from Air Products and Chemicals; and TEGOSTAB® B 4690 available from Evonik Degussa.

Cross-Linkers

Examples of cross-linkers that may be used include, but are not limited to diethanol amine, and active-hydrogen containing compounds intended primarily for making flexible polyurethane foam.

Dendritic Macromolecules

An optional additive in the present compositions, contemplated for use as an auxiliary load-bearing improvement agent, is a dendritic macromolecule as discussed in PCT application WO 02/10247 A1, with reference to U.S. Provisional Application 60/221,512. A more extensive discussion of what is a dendritic macromolecule can be found in U.S. Pat. No. 6,093,777. All the patents and applications mentioned in this paragraph are hereby incorporated herein by reference to describe these dendritic macromolecules, how to make them, and how to use them in polyurethane foam compositions.

Inorganic Particulates

In some embodiments, inorganic particulates, such as fire retardant inorganic particulates, can be excluded from the polyol blends and formulations to reduce the potential for settling, separation and clogging of filters. In an alternative embodiment, however, low levels of inorganic particulates can be incorporated, preferably with relatively continuous agitation. Preferably, the level of inorganic particulates is less than about 10% by weight; more preferably less than about 5% by weight and most preferably below about 1% by weight, based on the weight of the polyol-containing composition.

Polyisocyanate

Suitable organic polyisocyanates include any of those known in the art for the preparation of polyurethane foams, like aliphatic, cycloaliphatic, araliphatic and, preferably, aromatic polyisocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof.

An example of a suitable common polyisocyanate is an 80/20 isomer mixture of 2,4 and 2,6 toluene diisocyanate known as MONDUR TD-80, Grade A, which is commercially available from Bayer Corporation. Such toluene diisocyanates have a functionality of 2. Typically, the use of such toluene diisocyanates in preparing a flexible foam is associated with a TDI index. A TDI index is the value representing the amount of toluene diisocyanate (TDI) available for reaction with the polyol, water and other active-hydrogen sources in a foam producing formulation. An index of 105, for example, indicates that there is a 5% excess of toluene diisocyanate equivalents available over the stoichiometric (i.e., the exactly proportional) amount required by the formulation.

Suitable diphenylmethane diisocyanates (MDI's) include mixtures of diphenylmethane diisocyanates and oligomers thereof having a polyisocyanate functionality greater than 2, known in the art as "crude" or polymeric MDI (polymethylene polyphenylene polyisocyanates), the known variants of MDI comprising urethane, allophanate, urea, biuret, carbodiimide, uretonimine and/or isocyanurate groups. The variants may be obtained by introducing uretonimine and/or carbodiimide groups in the polyisocyanates, such as uretonimine and/or carbodiimide modified polyisocyanate having an NCO value of at least 20% by weight, and/or by reacting such a polyisocyanate with one or more polyols having a hydroxyl functionality of 2-6 and a molecular weight of 62-500 to obtain a modified polyisocyanate having an NCO value of at least 20% by weight.

Mixtures of toluene diisocyanate and diphenylmethane diisocyanate and/or prepolymers thereof (adjusting the functionality number below accordingly) and/or polymethylene polyphenylene polyisocyanates also may be used. For example, polyisocyanates can be used which have an average polyisocyanate functionality of 1.7 to 3.5 and preferably 1.8 to 3.2.

The polyol-containing composition can comprise any one or more of a wide variety of optional additives employed in the flexible polyurethane foam industry. The additive can be for example a nonionic surfactant, an auxiliary blowing agent, a flame retardant, a deodorant, a foaming catalyst, a colorant, extending agents, fillers, anti-oxidants, derivatives thereof, and combinations thereof.

Methods of making foams are known to those familiar with the technology.

EXAMPLES

Description of Components Used in the Following Examples

Foam Preparation

Hand mix slabstock foams of the working examples shown in Tables 1-9 were produced at 107-110 index (i.e., 7 to 10% stoichiometric excess of isocyanate to isocyanate-reactive polyol-containing composition components) unless otherwise indicated. The components of the polyol-containing composition were first pre-blended without the tin catalyst. This pre-blend was mixed for 20 minutes and then conditioned at 25° C. in a closed container for at least 2 hours prior to use.

Box foams were made by mixing and pouring a total of 700 g of liquid material (polyol-containing composition and isocyanate) into a 12 in.×12 in.×12 in. box lined with a polyethylene bag. The resin component was weighed into a tall ~44 oz. cup, and the required amount of tin catalyst was added just prior to the foaming operation. This resin blend (including the tin catalyst) was mixed continuously for 19 seconds after which the isocyanate (Mondur® TD-80, conditioned at 25° C.) was rapidly poured into the 44 oz. cup of mixing material. This polyol-containing composition/TDI blend was then mixed for an additional 6 seconds.

When the mix was complete, the reacting material was then poured into the 12×12×12 inch box, where it was allowed to foam and cure under ambient conditions. After 24 hours the foam was removed from the box and cut into specifically sized samples to allow measurement of physical properties such as tear strength, tensile strength and elongation. All mechanical strength property testing was performed at 25° C. and 50% relative humidity according to ASTM D3574-08. Physical property test results are displayed in Tables 1-9, comparing foams of the invention (Examples 1-8) to comparative foams (Comparative Examples A-J).

Materials and Abbreviations

ARCOL® F-3022 (available from Bayer Material Science) is a 3000 molecular weight polyether triol with a nominal hydroxyl value (OH value) of 56.

ARCOL® HS-100 (available from Bayer Material Science) is a copolymer polyol (CPP) with a nominal OH value of 28. This product has a nominal styrene/acrylonitrile solids content of 43% by weight.

STEPANPOL® PS-70L (available from Stepan Company) is a diethylene glycol-phthalic anhydride-based polyester polyol with a nominal OH value of 70.

SOYOL® T22-060-G (available from Urethane Soy Systems) is a bio-based polyol produced from soybean oil with a nominal OH value of 62.

Castor Oil #1 (available from Alnor Oil) is a bio-based polyol with a nominal OH value of 164.

Bio-based Polyol (ESBO-Derived Polyol) is a bio-based polyol produced from epoxidized soybean oil with a nominal OH value of 56. It is commercially available, e.g., the BiOH® polyols (available from Cargill), or may be made by following the procedures described in U.S. Pat. No. 7,786,239, the contents of which are incorporated by reference herein for its disclosure of techniques for the production of bio-based polyols.

DABCO® DC-5950 (available from Air Products and Chemicals) is an alkoxylated silicone-containing surfactant for flexible polyurethane foam.

DABCO® DC-5986 (available from Air Products and Chemicals) is an alkoxylated silicone-containing surfactant for flexible polyurethane foam.

NIAX® L-650 (available from Momentive Performance Materials) is an alkoxylated silicone-containing surfactant for flexible polyurethane foam.

NIAX® L-670 (available from Momentive Performance Materials) is an alkoxylated silicone-containing surfactant for flexible polyurethane foam.

TCAT® 110 (available from Gulbrandsen Chemicals) is a stannous octoate catalyst.

NIAX® A-1 (available from Momentive Performance Materials) is a catalyst consisting of bis(dimethylaminoethyl) ether.

DABCO® 33LV (available from Air Products and Chemicals) is a catalyst consisting of triethylene diamine.

FYROL® FR-2 (available from ICL Industrial Products) is a flame retardant consisting of tris(1,3-dichloroisopropyl) phosphate.

ISONOX® 132 (available from SI Group) is an antioxidant consisting of 2,6-ditertiary-butyl-4-sec-butylphenol.

MONDUR® TD-80 Grade A (available from Bayer Material Science) is an 80/20 isomer mixture of 2,4- and 2,6-toluene diisocyanate (TDI)

PA—Phthalic anhydride
DEG—Diethylene glycol
TMP—Trimethylol propane
PO—Propylene oxide
EO—Ethylene oxide
CO—Castor oil
SBO—Soybean oil
ESBO—Epoxidized soybean oil
DMC—Double metal cyanide
RT—Room temperature
TSI—Toluene sulfonic isocyanate
GPC—Gel permeation chromatography
HPLC—High performance liquid chromatography
AV—Acid Value
OHv—Hydroxyl Value
Mn—number-average molecular weight
Mw—weight-average molecular weight Analytical Methods The OHv, AV, water content, and viscosity of the polyols are analyzed by standard analytical procedures.

The GPC chromatograms were run on a Waters HPLC/GPC system with a model 515 HPLC pump, model 717 autosampler, model 2410 RI detector, and model 486 UV detector. THF (tetrahydrofuran) was used as the eluent at 1.00 mL/min. Four Phenomenex Phenogel columns covering the MW of 500-$10^4$ Daltons were used with the column oven temperature set at 35° C. The Waters Enpower software package was used to analyze the GPC results. The MWs of the polyols were calculated from a relative calibration using narrow polystyrene as standards.

Synthesis Examples

Synthesis of Aromatic Polyester-Ether Polyol (Used in Example 5)

STEPANPOL® PS-2002 (654 g) and DMC (0.76 g) was mixed at RT in a 4 L pressure vessel. The vessel was heated to 140-150° C. under a vacuum of −0.01 MPa. Vacuum was maintained for 1 h at 140-150° C. A PO/EO mixture of 55/45 weight ratio was gradually charged in at 0.2 MPa and the temperature was maintained at 158-165° C. until a total of 1208 g of the mixture was added, taking 2 h. The reaction was continued at 160° C. for another 2 h, and the pressure was released and the reactor was allowed to cool. The content was discharged at 100° C. The product, weighing 1800 g, is a clear water-white liquid having an APHA color of 50, OHv of 64.8 mg KOH/g, AV of 0.25 mg KOH/g and viscosity of 1400 cps at 25° C.

Synthesis of Transesterification Reaction Product B Based on PA, DEG, CO and SBO (Used in Example 6)

PA (1234 g), DEG (930 g), CO (1504 g) and SBO (496 g) were charged into a 5-liter 4-armed flask equipped with a mechanical stirrer, nitrogen inlet, thermocouple probe, and a packed column connected to a water-cooled condenser and a condensate-collection flask. The flask was heated to 197-210° C., collecting water gradually along the process which lasted for a total of ca. 34 hours until the AV of the polyol reached 1.2 mg KOH/g. Tyzor TBT (2.0 g) was used as the catalyst and was added at 170° C. when water collection had slowed down. The OHv of the polyol was adjusted by back-adding DEG. The product is a clear amber liquid having an OHv of 68 mg KOH/g, AV of 1.2 mg KOH/g, and viscosity of 8800 cps at 25° C. Mn=1275, Mw=2112, and Mw/Mn=1.7. Total oil content in the polyol is 50% based on charge.

Synthesis of Transesterification Reaction Product C Based on PA, DEG, CO and SBO (Used in Example 7)

PA (543 g), DEG (434 g), and SBO (327 g) were charged into a 3-liter 4-armed flask equipped with a mechanical stirrer, nitrogen inlet, thermocouple probe, and a packed column connected to a water-cooled condenser and a condensate-collection flask. The flask was heated to 170° C. and Tyzor TBT (1.1 g) was added. The content was heated to 210-220° C., collecting water gradually along the process which lasted for ca. 8 h until the AV of the polyol reached 2.7 mg KOH/g, at which point CO (993 g) was added. The mixture was heated to 210-220° C. and maintained for ca. 16 h. The OHv of the polyol was adjusted by blowing off the excess DEG charged with nitrogen. The product, weighing 2129 g, is a clear amber liquid having an OHv of 66.5 mg KOH/g, AV of 0.8 mg KOH/g, and viscosity of 5000 cps at 25° C. Mn=1687, Mw=2784, and Mw/Mn=1.7. Total oil content in the polyol is 60% based on charge.

Synthesis of Transesterification Reaction Product D Based on PA, EG, CO and SBO (Used in Example 8)

PA (769 g), EG (350 g), CO (1129 g) and SBO (372 g) were charged into a 5-liter 4-armed round-bottomed flask equipped with a mechanical stirrer, nitrogen inlet, thermocouple probe, and a packed column connected to a water-cooled condenser and a condensate-collection flask. The content of the flask was heated to 170° C. and Tyzor® TnBT (1.25 g) was added. The content was heated to 190° C. and water condensation started in the overhead. The reaction temperature was gradually increased to 220° C. during a 6 h period, and then maintained at 220° C. for 19.5 h until the AV of the polyol had decreased to 1.6 mg KOH/g. The AV was further decreased to 1.1 mg KOH/g by adding ESBO (24 g), and the OHv of the polyol was adjusted to 70 mg KOH/g by back-adding EG (18 g), taking 3 h. The product, weighing 2514 g, is a clear amber liquid and has an OHv of 69.0 mg KOH/g, AV of 1.1 mg KOH/g, and viscosity of 8,800 cps at 25° C. Mn=1410, Mw=2878, and Mw/Mn=2.0. Total natural oil content in the polyol is 60% based on charge.

Illustrative Calculation of Aromatic Ester Content for Example 7:

The molecular weight of PA (148) plus atomic weight of oxygen from the glycol (16) comprises the "aromatic ester content" molecular weight (168) due to the initial amount of PA. The initial weight percentage charge of PA based on weight of total charges in Synthesis Example 7 comes to 24.67%. Therefore, there is 27.3% aromatic ester group content in Example 7 [(168/148)×24.671]. When Example 7 is incorporated at 7.5 weight percent (cf. Table 7) into the polyol-containing composition, this results (27.3×7.5/100) in 2.05% aromatic ester group content (cf. Table 8) in the polyol-containing composition.

TABLE 1

Tear, Tensile and Elongation Properties for Foam Produced with Soyol T-22-060G

|  | Comparative Example A | Comparative Example B | Example 1 |
|---|---|---|---|
| Petroleum-based Polyether Polyol (Arcol F-3022) | 90.0 | 82.5 | 67.5 |
| Bio-based Polyol (Soyol T-22-060G) | — | 7.5 | 7.5 |
| Polyester Polyol (Stepanpol ® PS-70L) | — | — | 15 |
| Arcol HS-100 | 10.0 | 10.0 | 10.0 |
| Water | 4.73 | 4.73 | 4.73 |
| Silicone Surfactant (DC-5950) | 0.80 | 0.80 | 0.80 |
| Tin Catalyst (Tcat-110) | 0.25 | 0.28 | 0.28 |
| Amine Catalyst (Niax ® A-1) | 0.03 | 0.03 | 0.03 |
| Amine Catalyst (Dabco ® 33LV) | 0.043 | 0.043 | 0.043 |
| Flame Retardant (FR-2) | 12.5 | 12.5 | 12.5 |
| Isonox 132 | 0.50 | 0.50 | 0.50 |
| Isocyanate Index | 107 | 107 | 107 |

TABLE 1-continued

Tear, Tensile and Elongation Properties for Foam Produced with Soyol T-22-060G

|  | Comparative Example A | Comparative Example B | Example 1 |
|---|---|---|---|
| TDI/Resin Ratio | 32.75/67.25 | 32.76/67.24 | 32.9/67.1 |
| Aromatic Ester Content (%) | 0 | 0 | 2.81 |
| Air Flow (cfm) | 4.1 | 3.8 | 3.8 |
| Density (pcf) | 1.56 | 1.54 | 1.59 |
| Tear Strength (lbf/in) | 2.0 | 1.8 | 2.0 |
| Tensile Strength (psi) | 14.2 | 13.2 | 14.4 |
| Elongation (%) | 152.3 | 135.3 | 153.7 |

TABLE 2

Tear, Tensile and Elongation Properties for Foam Produced with Castor Oil

|  | Comparative Example C | Comparative Example D | Example 2 |
|---|---|---|---|
| Petroleum-based Polyether Polyol (Arcol F-3022) | 90.0 | 82.5 | 67.5 |
| Bio-based Polyol (Castor Oil #1) | — | 7.5 | 7.5 |
| Polyester Polyol (Stepanpol ® PS-70L) | — | — | 15.0 |
| Arcol HS-100 | 10.0 | 10.0 | 10.0 |
| Water | 4.73 | 4.73 | 4.73 |
| Silicone Surfactant B (L-650) | 0.80 | 0.80 | 0.80 |
| Tin Catalyst (Tcat-110) | 0.27 | 0.27 | 0.26 |
| Niax ® A-1 | 0.03 | 0.03 | 0.03 |
| Dabco ® 33LV | 0.043 | 0.043 | 0.043 |
| Flame Retardant (FR-2) | 12.5 | 12.5 | 12.5 |
| Isonox 132 | 0.50 | 0.50 | 0.50 |
| Isocyanate Index | 107 | 107 | 107 |
| TDI/Resin Ratio | 32.7/67.3 | 33.3/66.7 | 33.4/66.6 |
| Aromatic Ester Content (%) | 0 | 0 | 2.81 |
| Air Flow (cfm) | 3.0 | 3.0 | 2.7 |
| Density (pcf) | 1.48 | 1.51 | 1.53 |
| Tear Strength (lbf/in) | 2.2 | 1.8 | 2.2 |
| Tensile Strength (psi) | 14.1 | 13.0 | 14.9 |
| Elongation (%) | 147.5 | 124.3 | 154.7 |

TABLE 3

Tear, Tensile and Elongation Properties for Foam Produced with Expoxidized SBO-Derived Polyol

|  | Comparative Example E | Example 3 | Comparative Example F | Example 4 |
|---|---|---|---|---|
| Petroleum-based Polyether Polyol (Arcol F-3022) | 70.0 | 55.0 | 70.0 | 55.0 |
| Bio-based Polyol (ESBO-Derived) | 30.0 | 30.0 | 30.0 | 30.0 |
| Polyester Polyol (Stepanpol ® PS-70L) | — | 15.0 | — | 15.0 |
| Arcol HS-100 | — | — | — | — |
| Water | 4.50 | 4.50 | 4.50 | 4.50 |
| Silicone Surfactant C (DC-5986) | 1.00 | 1.00 | — | — |
| Silicone Surfactant D (L-670) | — | — | 1.00 | 1.00 |
| Tin Catalyst (Tcat-110) | 0.20 | 0.20 | 0.20 | 0.20 |
| Niax ® A-1 | 0.066 | 0.066 | 0.066 | 0.066 |
| Isocyanate Index | 110 | 110 | 110 | 110 |
| TDI/Resin Ratio | 35.22/64.78 | 35.36/64.64 | 35.18/64.82 | 35.32/64.68 |
| Aromatic Ester Content (%) | 0 | 2.81 | 0 | 2.81 |

TABLE 3-continued

Tear, Tensile and Elongation Properties for Foam Produced with Expoxidized SBO-Derived Polyol

|  | Comparative Example E | Example 3 | Comparative Example F | Example 4 |
|---|---|---|---|---|
| Air Flow (cfm) | 3.4 | 2.8 | 4.3 | 4.2 |
| Density (pcf) | 1.43 | 1.43 | 1.44 | 1.51 |
| Tear Strength (lbf/in) | 1.34 | 1.46 | 1.50 | 1.81 |
| Tensile Strength (psi) | 11.3 | 12.4 | 11.5 | 12.9 |
| Elongation (%) | 115.1 | 135.2 | 129.9 | 139.1 |

TABLE 4

EO/PO-Derived Aromatic Polyester Polyol in High Bio-content Foam Formulations

|  | Comparative Example G | Example 5 |
|---|---|---|
| Petroleum-based Polyether Polyol (Arcol F-3022) | 70 | 55 |
| Bio-based Polyol (ESBO-Derived) | 30 | 30 |
| Polyester Polyol (Stepanpol PS-70L) | — | — |
| Polyester Polyol (EO/PO Derived) | — | 15 |
| Water | 4.5 | 4.5 |
| Niax L-670 | 1.0 | 1.0 |
| Tcat-110 (Reactivity Matched) | 0.20 | 0.18 |
| Niax A-1 | 0.07 | 0.07 |
| Isocyanate Index | 110 | 110 |
| (A/B) Ratio | 35.2/64.8 | 35.3/64.7 |

TABLE 5

Physical Properties of Foam Made With EO/PO-Derived Aromatic Polyester Polyol Compared to Control Foam (@ 15 pts. Polyester Polyol)

|  | Example 5 | Comparative Example G (No Polyester Polyol) |
|---|---|---|
| Aromatic Ester Content | 2.81% | 0% |
| TDI/Resin Ratio (110 Index) | 35.3/64.7 | 35.2/64.8 |
| Foam Density (pcf) | 1.50 | 1.43 |
| Air Flow (cfm) | 3.48 | 4.37 |
| Tear Strength (pli) | 1.73 | 1.44 |
| Tensile Strength (psi) | 13.4 | 11.7 |
| Elongation (%) | 123.8 | 117.5 |
| 25% IFD (lb-force) | 36.2 | 31.8 |
| 25% Guide Factor (IFD/den.) | 24.1 | 22.2 |
| 65% IFD (lb-force) | 69.2 | 57.5 |
| 65% Guide Factor (IFD/den.) | 46.1 | 40.2 |
| Hysteresis (%) | 61.5 | 61.8 |
| 90% Compression Set (%) | 12.1 | 9.5 |
| Ball Rebound Resiliency (%) | 28.5 | 28.5 |

TABLE 6

Tear Strength, Tensile Strength and Elongation Improvements Observed for Invention Examples 1-5 Relative to Control Foam Examples

|  | Comparative Example B vs. Example 1 | Comparative Example D vs. Example 2 | Comparative Example E vs. Example 3 | Comparative Example F vs. Example 4 | Comparative Example G vs. Example 5 |
|---|---|---|---|---|---|
| Tear Strength Improvement* | 11.1% | 22.2% | 9.0% | 20.7% | 20.1% |
| Tensile Strength Improvement** | 9.1% | 14.6% | 9.7% | 12.2% | 14.5% |
| Elongation (Relative Improvement)*** | 13.6% | 24.5% | 17.5% | 7.1% | 5.4% |

*Average (relative) tear strength improvement: 16.6%
**Average (relative) tensile strength improvement: 12.0%
***Average (relative) elongation improvement: 13.6%

TABLE 7

Use of Transesterification Reaction Product in Flexible Polyurethane Foam Formulations

|  | Example 6 | Comparative Example H | Example 7 | Comparative Example I | Example 8 | Comparative Example J |
|---|---|---|---|---|---|---|
| Petroleum-Based Polyether Polyol (Arcol F-3022) | 92.5 | 92.5 | 92.5 | 92.5 | 92.5 | 92.5 |
| Bio-Based Polyol (ESBO-Derived) | — | 7.5 | — | 7.5 | — | 7.5 |
| Transesterification Reaction Product B | 7.5 | — | — | — | — | — |
| Transesterification Reaction Product C | — | — | 7.5 | — | — | — |
| Transesterification Reaction Product D | — | — | — | — | 7.5 | — |
| Water | 4.5 | 4.5 | 4.5 | 4.5 | 4.5 | 4.5 |
| Silicone Surfactant (L-670) | 1.0 | 1.0 | 1.0 | 1.0 | 1.0 | 1.0 |
| Tin Catalyst (Tcat-110) | 0.13 | 0.13 | 0.13 | 0.13 | 0.13 | 0.13 |
| Niax A-1 | 0.07 | 0.07 | 0.07 | 0.07 | 0.07 | 0.07 |
| Isocyanate Index | 108 | 108 | 108 | 108 | 108 | 108 |
| (A/B) Ratio | 34.87/65.13 | 34.81/65.19 | 34.87/65.13 | 34.81/65.19 | 34.88/65.12 | 34.81/65.19 |

TABLE 8

Physical Property Comparison of Transesterification Reaction Products vs. Bio-Based Polyol (@7.5 pts. Bio-Based Polyol)

|  | Example 6 | Comparative Example H | Example 7 | Comparative Example I | Example 8 | Comparative Example J |
|---|---|---|---|---|---|---|
| Aromatic Ester Content** | 2.57% | 0% | 2.05% | 0% | 2.56% | 0% |
| TDI/Resin Ratio (108 Index) | 34.9/65.1 | 34.8/65.2 | 34.9/65.1 | 34.8/65.2 | 34.9/65.1 | 34.8/65.2 |
| Foam Density (pcf) | 1.55 | 1.58 | 1.52 | 1.60 | 1.56 | 1.69 |
| Air Flow (cfm) | 4.82 | 4.79 | 4.94 | 4.93 | 4.98 | 4.95 |
| Tear Strength (pli) | 2.42 | 2.12 | 2.41 | 2.13 | 2.35 | 2.20 |
| Tensile Strength (psi) | 13.0 | 13.0 | 12.8 | 12.7 | 13.9 | 13.8 |
| Elongation (%) | 137.2 | 142.9 | 146.2 | 143.6 | 167.6 | 166.8 |
| 25% IFD (lb-force) | 34.9 | 32.3 | 31.9 | 30.9 | 29.4 | 27.6 |
| 25% Guide Factor (IFD/den.) | 22.6 | 20.4 | 21.0 | 19.3 | 18.8 | 16.3 |
| 65% IFD (lb-force) | 66.7 | 64.6 | 58.5 | 61.2 | 58.4 | 60.4 |
| 65% Guide Factor (IFD/den.) | 43.2 | 40.9 | 38.5 | 38.3 | 37.4 | 35.7 |
| Hysteresis (%) | 69.6 | 70.8 | 70.2 | 70.1 | 66.8 | 68.8 |
| 90% Compression Set (%) | 5.8 | 5.2 | 5.9 | 5.6 | 6.5 | 6.3 |
| Ball Rebound Resiliency (%) | 34.3 | 36.0 | 35.8 | 33.5 | 30.7 | 35.6 |

Example 6 is a natural oil containing aromatic polyester polyol that contains 50% bio-content.
Example 7 is a natural oil containing aromatic polyester polyol that contains 60% bio-content.
Example 8 is a natural oil containing aromatic polyester polyol that contains 60% bio-content.

TABLE 9

Tear Strength, Tensile Strength and Elongation Improvements Observed for Invention Examples 6-8 Relative to Control Foam Examples

|  | Comparative Example H vs. Example 6 | Comparative Example I vs. Example 7 | Comparative Example J vs. Example 8 |
|---|---|---|---|
| Tear Strength Improvement | 14.2% | 13.1% | 6.8% |
| Tensile Strength Improvement | 0% | 0.8% | 0.7% |
| Elongation (Relative Improvement) | −4.0% | 1.8% | 0.5% |

Average tearstrength improvement: 11.4%

The results and data presented for Examples 1-5 (Tables 1-6) demonstrate that flexible polyurethane foam produced from polyol-containing compositions comprising bio-based polyol (7.5% of the polyol-containing composition) and petroleum-based polyether polyol in combination with aromatic polyester polyol (15% of the polyol component) exhibit an average 16.6% improvement in tear strength, average 12% improvement in tensile strength and average 13.6% improvement in elongation, as shown in Table 6. The improvements achieved through incorporation of aromatic polyester polyol with bio-based polyol allow these foam properties to recover to the point that they closely approximate (or exceed) those obtained using only standard petroleum-based polyether polyol.

The results presented above for Examples 6-8 (Tables 7-9) demonstrate that transesterified reaction products produced through transesterification of aromatic polyester polyol with natural oil or a functionalized natural oil blend provide substantially improved foam mechanical properties, particularly tear strength.

The present invention is now described in such full, clear, concise and exact terms as to enable any person skilled in the art to which it pertains, to practice the same. It is to be understood that the foregoing describes preferred embodiments of the invention and that modifications may be made therein without departing from the spirit or scope of the present invention as set forth in the appended claims.

What is claimed is:

1. A flexible polyurethane foam produced by reacting a polyol-containing composition and a polyisocyanate-containing composition, wherein the polyisocyanate-containing composition comprises toluene diisocyanates, diphenylmethane diisocyanates, or mixtures thereof and wherein the polyol-containing composition comprises 10 to 40 weight percent of a bio-based polyol, 10 to 35 weight percent of an aromatic polyester polyol and 45 to 85 weight percent of a petroleum-based polyether polyol,
wherein the bio-based polyol is a functionalized natural oil or a functionalized natural oil-derived fatty acid or fatty ester and has a hydroxyl value within the range of 25 to 230 mg KOH/g;
wherein the aromatic polyester polyol has a hydroxyl value of at least 40 mg KOH/g;
wherein the petroleum-based polyether polyol has a hydroxyl value within the range of 20 to 90 mg KOH/g;
wherein the polyol-containing composition comprises an aromatic ester content derived from the aromatic polyester polyol of at least about 2 weight percent, based on the total weight of the polyol-containing composition, and wherein at least about 80% by weight of the contents of the bio-based polyol are obtained directly or indirectly from a natural oil.

2. The flexible polyurethane foam of claim 1 wherein the foam exhibits at least about a 10 percent increase in at least one mechanical strength property, as measured by ASTM D3574-08, as compared to the mechanical strength properties, as measured by ASTM D3574-08, of a flexible polyurethane foam made under substantially identical conditions except for the exclusion of the aromatic polyester polyol.

3. The flexible polyurethane foam of claim 1 wherein the bio-based polyol is selected from the group consisting of castor oil, soybean oil-based polyols, and epoxidized soybean oil-based polyols.

4. The flexible polyurethane foam of claim 1 wherein the polyisocyanate-containing composition is used at an NCO index within the range of 1.05 to 1.10.

5. The flexible polyurethane foam of claim 1 wherein the aromatic polyester polyol is a phthalic acid diethylene glycol polyester polyol.

6. The flexible polyurethane foam of claim 1 wherein the polyether polyol is produced by anionic polymerization of one or more alkylene oxides.

\* \* \* \* \*